United States Patent
Tapley et al.

(10) Patent No.: US 9,117,238 B2
(45) Date of Patent: Aug. 25, 2015

(54) METHOD, SYSTEM, AND MEDIUM FOR GENERATING A MOBILE INTERFACE INDICATING TRAFFIC LEVEL FOR LOCAL MERCHANTS

(71) Applicants: John Tapley, Santa Clara, CA (US); Krystal Rose Higgins, Sunnyvale, CA (US); Matt Lee Giger, Portland, OR (US); David W. Goldman, Portland, OR (US)

(72) Inventors: John Tapley, Santa Clara, CA (US); Krystal Rose Higgins, Sunnyvale, CA (US); Matt Lee Giger, Portland, OR (US); David W. Goldman, Portland, OR (US)

(73) Assignee: eBay Inc., San Jose, CA (US)

( * ) Notice: Subject to any disclaimer, the term of this patent is extended or adjusted under 35 U.S.C. 154(b) by 175 days.

(21) Appl. No.: 13/686,195

(22) Filed: Nov. 27, 2012

(65) Prior Publication Data
US 2013/0282520 A1 Oct. 24, 2013

Related U.S. Application Data

(60) Provisional application No. 61/625,836, filed on Apr. 18, 2012.

(51) Int. Cl.
*G06Q 30/00* (2012.01)
*G06Q 30/06* (2012.01)
*G01C 21/34* (2006.01)
(Continued)

(52) U.S. Cl.
CPC .......... *G06Q 30/0639* (2013.01); *G01C 21/206* (2013.01); *G01C 21/34* (2013.01); *G06Q 30/0633* (2013.01); *G06Q 30/0641* (2013.01); *H04W 4/028* (2013.01); *H04W 4/02* (2013.01)

(58) Field of Classification Search
CPC ............... G06Q 30/06–30/0643; G01C 21/00; G01C 21/34; G01C 21/206; G01C 21/005; G01C 21/3626; G01C 21/3635; G01C 21/3652; G01C 21/3664; G01C 21/3679; G01C 21/3682; G01C 21/3691
USPC ......... 705/26.1–27.2; 701/400, 408–410, 420
See application file for complete search history.

(56) References Cited

U.S. PATENT DOCUMENTS

2002/0069131 A1 * 6/2002 Miyata et al. ................... 705/26
2007/0106468 A1 5/2007 Eichenbaum et al.
(Continued)

FOREIGN PATENT DOCUMENTS

WO WO-2013158153 A1 10/2013

OTHER PUBLICATIONS

"Ford's Sync Destinations App Plans Your Route Before You Get in the Car". Dec. 29, 2010. Devin Coldewey.*
(Continued)

*Primary Examiner* — William Allen
(74) *Attorney, Agent, or Firm* — Schwegman Lundberg & Woessner, P.A.

(57) ABSTRACT

Systems and methods to provide a prioritized shopping system are discussed. For example, a method can include receiving a list of target items, receiving busyness data for a plurality of local merchants, developing a prioritized shopping plan, and communicating the prioritized shopping plan to a mobile device. Each target item in the list of target items can represents a product or service that a user has indicated an interest in purchasing. The prioritized shopping plan is based at least in part on the busyness data and the list of target items. Busyness data provides an indication of traffic levels within at least a portion of the plurality of local merchants.

20 Claims, 10 Drawing Sheets

(51) Int. Cl.
*G01C 21/20* (2006.01)
*H04W 4/02* (2009.01)

(56) References Cited

U.S. PATENT DOCUMENTS

| 2007/0150369 | A1 | 6/2007 | Zivin |
| 2011/0161119 | A1* | 6/2011 | Collins ............................. 705/4 |
| 2011/0184743 | A1* | 7/2011 | Trollman ....................... 705/1.1 |
| 2011/0224899 | A1* | 9/2011 | Mathews ....................... 701/201 |
| 2011/0225068 | A1* | 9/2011 | Figueroa et al. ............. 705/27.1 |
| 2011/0313779 | A1 | 12/2011 | Herzog et al. |
| 2013/0013191 | A1* | 1/2013 | Dillahunt et al. ............. 701/423 |
| 2013/0096966 | A1* | 4/2013 | Barnes, Jr. ....................... 705/5 |
| 2014/0046789 | A1* | 2/2014 | Baliga ......................... 705/26.1 |

OTHER PUBLICATIONS

"International Application Serial No. PCT/US2012/069912, International Search Report mailed Feb. 8, 2013", 2 pgs.

"International Application Serial No. PCT/US2012/069912, Written Opinion mailed Feb. 8, 2013", 5 pgs.

"International Application Serial No. PCT/US2012/069912, International Preliminary Report on Patentability mailed Oct. 30, 2014", 7 pgs.

* cited by examiner

METHOD, SYSTEM, AND MEDIUM FOR GENERATING A MOBILE INTERFACE INDICATING TRAFFIC LEVEL FOR LOCAL MERCHANTS

CLAIM OF PRIORITY

This application claims the benefit of U.S. Patent Application Ser. No. 61/625,836, titled "Systems and Method for Prioritizing Local Shopping Options," filed Apr. 18, 2012. The entire content of the above application is incorporated herein by reference in its entirety.

TECHNICAL FIELD

This application relates generally to data processing within a network-based system operating over a distributed network, and more specifically to systems and methods to identify, visualize, and prioritize local shopping options for a shopper.

BACKGROUND

The ever increasing use of intelligent mobile devices, such as the iPhone® (from Apple, Inc. of Cupertino Calif.) or in-car navigation systems, which include data connections and location determination capabilities is slowly changing the way people think about using information resource within a mobile environment. Intelligent mobile devices can provide users with nearly instant information that can be used to alter traditional activities, such as shopping and payment processing, to name just a few.

BRIEF DESCRIPTION OF THE DRAWINGS

Some embodiments are illustrated by way of example and not limitation in the figures of the accompanying drawings in which.

DEFINITIONS

Figure 1:
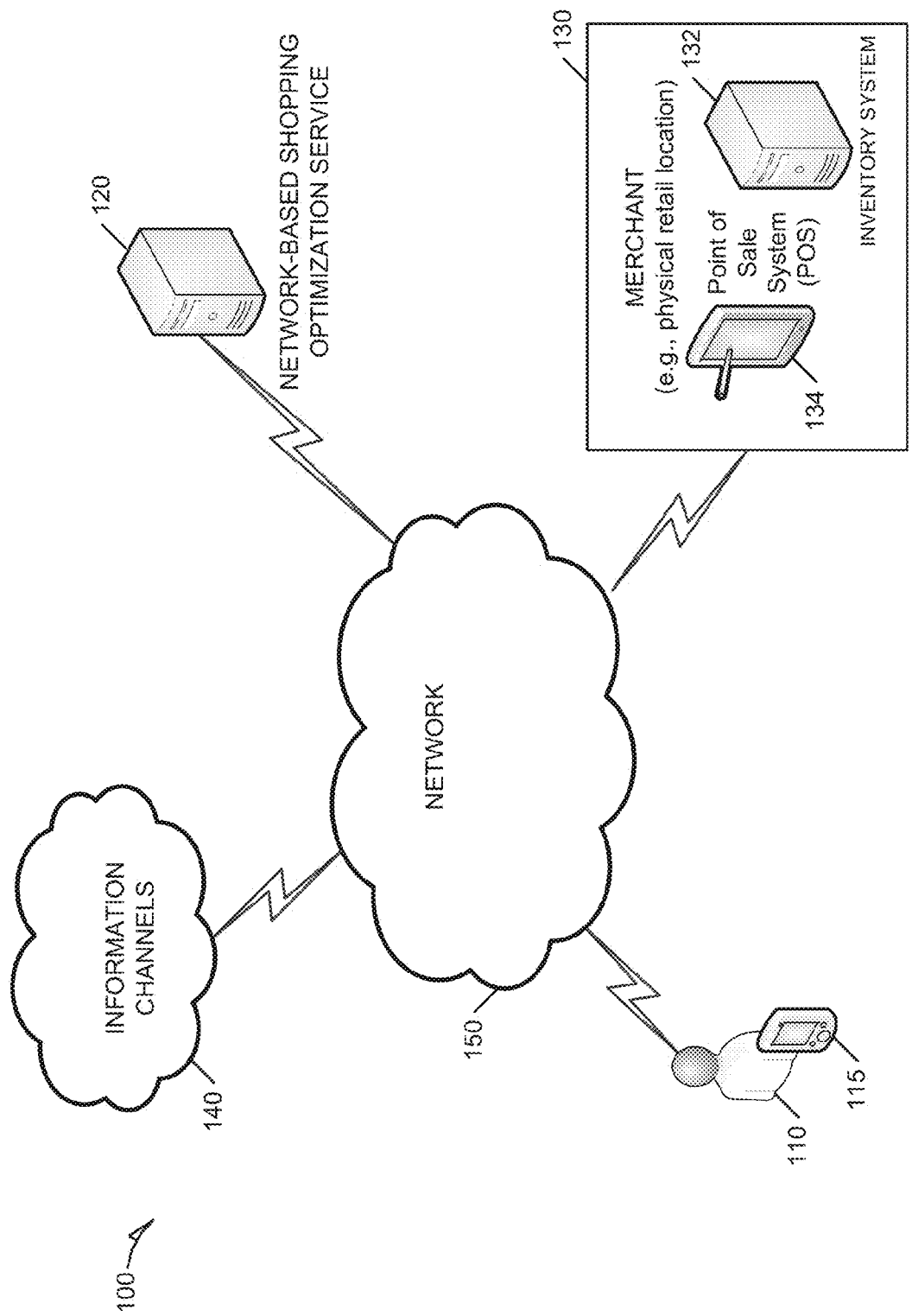
FIG. 1 is a block diagram depicting a system for providing prioritized local shopping services, according to an example embodiment.

Location—For the purposes of this specification and the associated claims, the term "location" is used to refer to a geographic location, such as a longitude/latitude combination or a street address. The term location is also used within this specification in reference to a physical location associated with a retail outlet (e.g., store).

Real-time—For the purposes of this specification and the associated claims, the term "real-time" is used to refer to calculations or operations performed on-the-fly as events occur or input is received by the operable system. However, the use of the term "real-time" is not intended to preclude operations that cause some latency between input and response, so long as the latency is an unintended consequence induced by the performance characteristics of the machine.

DETAILED DESCRIPTION

Example systems and methods for providing and using a prioritized local shopping service are described. In some example embodiments, the systems and methods for providing a prioritized local shopping service allow a user to use a location-aware mobile device to determine how best to prioritize shopping stops within a mall or around town to optimize time and ability to complete planned purchases. In an example, the prioritized local shopping service receives inputs from various sources to determine how busy different merchant locations are, levels of inventory, and optionally deals on desired items. The prioritized shopping service can use the input data to develop an optimized shopping plan and provide useful graphical displays regarding busyness and proposed route, among other things. In the following description, for purposes of explanation, numerous specific details are set forth in order to provide a thorough understanding of example embodiments. It will be evident, however, to one skilled in the art that the present invention may be practiced without these specific details. It will also be evident that a navigated shopping system is not limited to the examples provided and may include other scenarios not specifically discussed.

In an example, a network-based prioritized local shopping service can monitor various channels of information, such as user check-ins, geo-located tweets, store sites, security cameras, and local inventory, among other things. From the various inputs the network-based prioritized shopping service can determine a store's "busyness" (e.g., traffic level), sales/discounts, and inventory. The determined information can be used to create a sorted, prioritized list (e.g., route) for a user to follow to optimize shopping efficiency and effectiveness. The service can also provide useful visualization tools, such as hotspot maps depicting the busyness at local retail outlets or within a mall. The network-based prioritized shopping service can also use the aggregated and analyzed information to track trends for use in refining future shopping trips. For example, the system can determine the best times to avoid food courts or certain retail locations due to foot traffic and sale patterns.

One of the many benefits provided by a network-based prioritized local shopping service can include reducing the time spent waiting in lines and avoiding crowds. Additionally, the network-based prioritized local shopping service can assist a user in ensuring that they do not miss out a deal or low inventory item. In the end, the network-based prioritized local shopping service can assist a user in minimizing shopping time, while still maximizing potential savings.

In accordance with an example embodiment, a network-based system can provide a platform to provide both a prioritized local shopping service and integrated payment capabilities. In certain examples, the prioritized local shopping service and the payment service can be provided by separate systems. In some examples, the user interacts with a network-based system (e.g., prioritized local shopping service and/or payment service) via a mobile device, such as a smartphone, a tablet computing device, or an in-vehicle intelligent navigation system, among others. In an example, the network-based system can include a publication module capable of delivering location-based offers to a user based on stored user profile data, local merchant campaigns, and current or future location data. In certain examples, using the prioritized local shopping service can include configuring automatic payments via an integrated or partner payment processing system, such as the PayPal™ payment system (from eBay Inc. of San Jose, Calif.).

Example System

FIG. 1 is a block diagram depicting a system for providing a network-based prioritized local shopping service. The system 100 can include a user 110, a network-based prioritized local shopping service system 120 (also referred to as network-based shopping system 120), a merchant 130, and network-based information channels 140. In an example, the user 110 can connect to the network-based shopping system 120 via a mobile device 115 (e.g., smart phone, PDA, laptop, or similar mobile electronic device capable of some form of data connectivity). In another example, a user, such as user 110, can be within a vehicle (not shown) and connect to the network-based shopping system 120 via a mobile device 115 or the vehicle may include an integrated mobile device capable of connecting to the network-based shopping service 120. In certain examples, the mobile device 115 can include an in-vehicle programmable navigation system. In an example, the merchant 130 can operate computer systems, such as an inventory system 132 or a point of sale (POS) system 134, among others. The network-based shopping system 120 can interact with any of the systems used by merchant 130 for operation of the merchant's retail or service business. In an example, the network-based shopping system 120 can work with both the POS system 134 and inventory system 132 to obtain access to inventory available at individual retail locations run by the merchant and match merchandise to item desired by users of the network-based shopping service 120. The information channels 140 can include information sources such as, social networks (e.g., FACEBOOK from Facebook, Inc. of Menlo Park Calif.), local check-in data, sensor networks within shopping malls, security camera feeds, cell phone tracking data (typically aggregated and anonymous), among others.

Example Operating Environment

Figure 2:
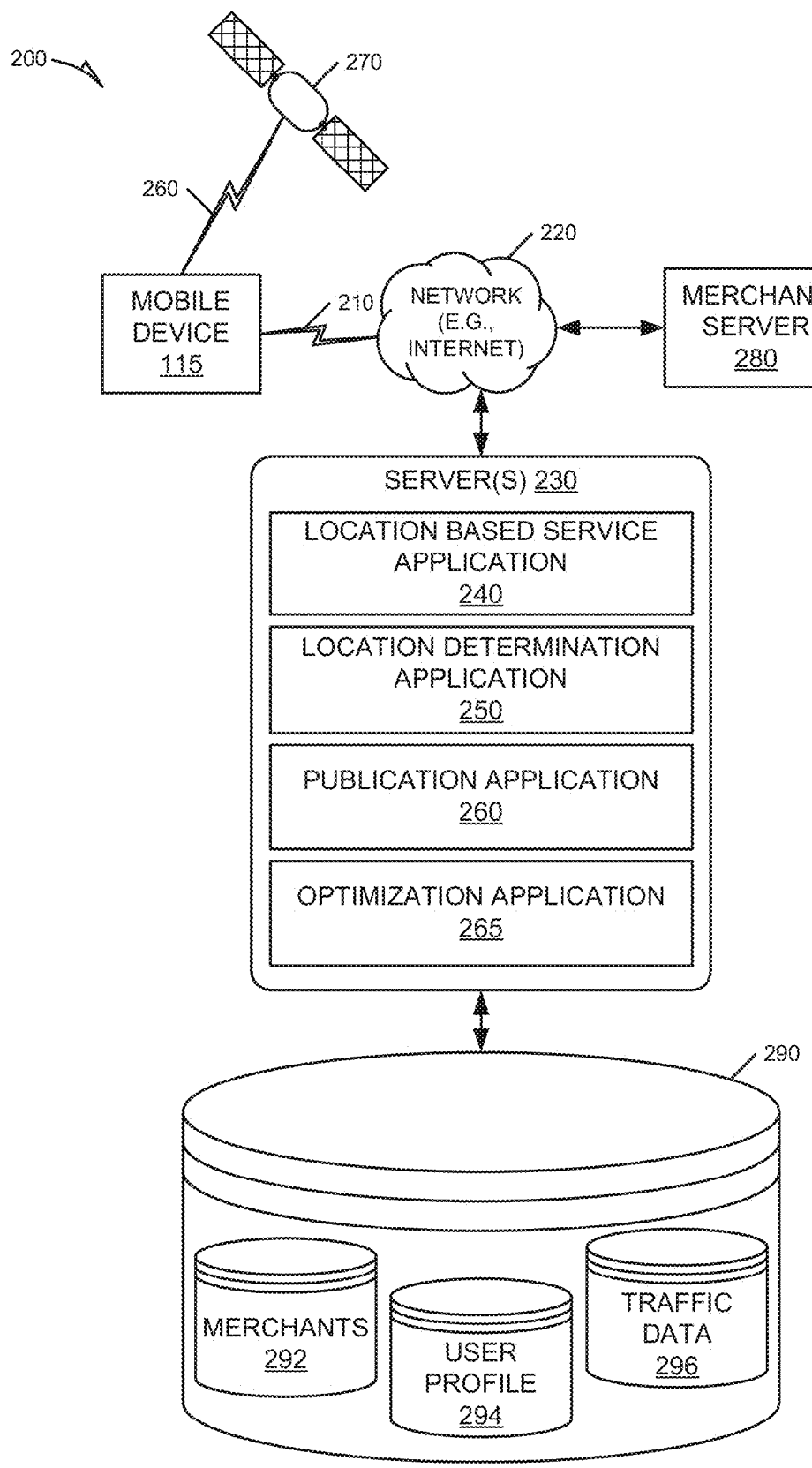
FIG. 2 is a block diagram illustrating an environment for operating a mobile device, according to an example embodiment.

FIG. 2 is a block diagram illustrating an environment for operating a mobile device, according to an example embodiment. The environment 200 is an example environment within which methods of a prioritized local shopping service can occur. The environment 200 can include a mobile device 115, a communication connection 210, a network 220, servers 230, a communication satellite 270, a merchant server 280, and a database 290. The servers 230 can optionally include location based service application 240, location determination application 250, publication application 260, and optimization application 265. The database 290 can optionally include merchant databases 292, user profile database 294, and/or traffic data (e.g., busyness data) database 296. The mobile device 115 represents one example device that can be utilized by a user to interact with a network-based shopping system, such as network-based shopping system 120. The mobile device 115 may be any of a variety of types of devices (for example, a cellular telephone, a personal digital assistant (PDA), a Personal Navigation Device (PND), in-vehicle navigation device), a handheld computer, a tablet computer, a notebook computer, or other type of movable device). The mobile device 115 may interface via a connection 210 with a communication network 220. Depending on the form of the mobile device 115, any of a variety of types of connections 210 and communication networks 220 may be used.

For example, the connection 210 may be Code Division Multiple Access (CDMA) connection, a Global System for Mobile communications (GSM) connection, or other type of cellular connection. Such connection 210 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, or other data transfer technology (e.g., fourth generation wireless, 4G networks). When such technology is employed, the communication network 220 may include a cellular network that has a plurality of cell sites of overlapping geographic coverage, interconnected by cellular telephone exchanges. These cellular telephone exchanges may be coupled to a network backbone (for example, the public switched telephone network (PSTN), a packet-switched data network, or to other types of networks).

In another example, the connection 210 may be Wireless Fidelity (Wi-Fi, IEEE 802.11x type) connection, a Worldwide Interoperability for Microwave Access (WiMAX) connection, or another type of wireless data connection. In such an embodiment, the communication network 220 may include one or more wireless access points coupled to a local area network (LAN), a wide area network (WAN), the Internet, or other packet-switched data network.

In yet another example, the connection 210 may be a wired connection, for example an Ethernet link, and the communication network may be a LAN, a WAN, the Internet, or other packet-switched data network. Accordingly, a variety of different configurations are expressly contemplated.

A plurality of servers 230 may be coupled via interfaces to the communication network 220, for example, via wired or wireless interfaces. These servers 230 may be configured to provide various types of services to the mobile device 115. For example, one or more servers 230 may execute location based service (LBS) applications 240, which interoperate with software executing on the mobile device 115, to provide LBSs to a user. LBSs can use knowledge of the device's location, and/or the location of other devices, to provide location-specific information, recommendations, notifications, interactive capabilities, and/or other functionality to a user. For example, an LBS application 240 can provide location data to a network-based shopping system 120, which can then be used to assist in generating offers relevant to the user's current location and enable payment via the network-based payment system 140. Knowledge of the device's location, and/or the location of other devices, may be obtained through interoperation of the mobile device 115 with a location determination application 250 executing on one or more of the servers 230. Location information may also be provided by the mobile device 115, without use of a location determination application, such as application 250. In certain examples, the mobile device 115 may have some limited location determination capabilities that are augmented by the location determination application 250. In some examples, the servers 230 can also include publication application 260 for providing location-aware offers that may be triggered by user-profile data or other information stored within the network-based shopping service 120. In certain examples, location data can be provided to the publication application 260 by the location determination application 250. In some examples, the location data provided by the location determination application 250 can include merchant information (e.g., identification of a retail location). In certain examples, the location determination application 250 can receive signals via the network 220 to further identify a location. For example, a merchant may broadcast a specific IEEE 802.11 service set identifier (SSID) that can be interpreted by the location determination application 250 to identify a particular retail location. In another example, the merchant may broadcast an identification signal via radio-frequency identification (RFID), near-field communication (NFC), or a similar protocol that can be used by the location determination application 250.

Example Mobile Device

Figure 3:
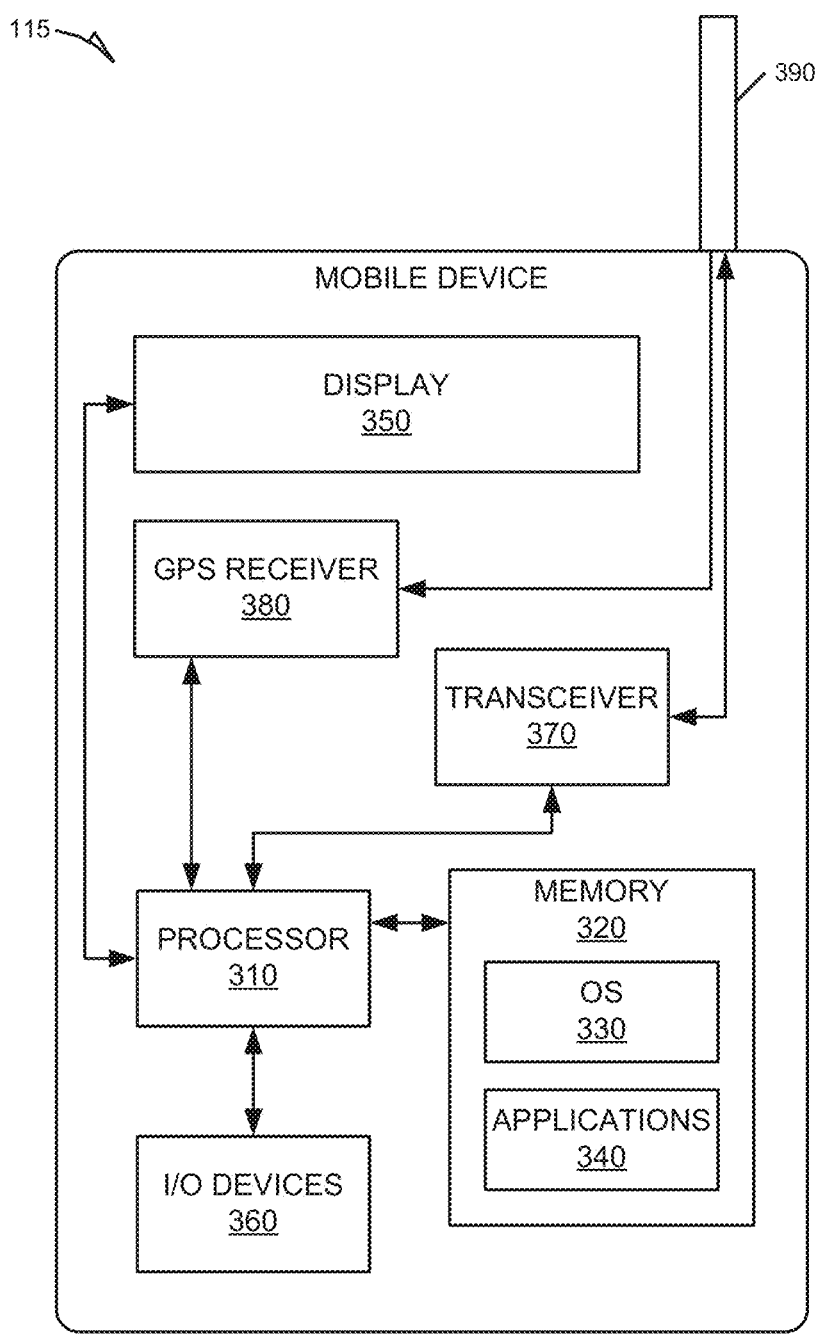
FIG. 3 is a block diagram illustrating a mobile device, according to an example embodiment.

FIG. 3 is a block diagram illustrating a mobile device, according to an example embodiment. The mobile device 115 may include a processor 310. The processor 310 may be any of a variety of different types of commercially available processors suitable for mobile devices (for example, an XScale architecture microprocessor, a Microprocessor without Interlocked Pipeline Stages (MIPS) architecture processor, or another type of processor). A memory 320, such as a Random Access Memory (RAM), a Flash memory, or other type of memory, is typically accessible to the processor. The memory 320 may be adapted to store an operating system (OS) 330, as well as application programs 340, such as a mobile location enabled application that may provide LBSs to a user. The processor 310 may be coupled, either directly or via appropriate intermediary hardware, to a display 350 and to one or more input/output (I/O) devices 360, such as a keypad, a touch panel sensor, a microphone, and the like. Similarly, in some embodiments, the processor 310 may be coupled to a transceiver 370 that interfaces with an antenna 390. The transceiver 370 may be configured to both transmit and receive cellular network signals, wireless data signals, or other types of signals via the antenna 390, depending on the nature of the mobile device 115. In this manner, the connection 210 with the communication network 220 may be established. Further, in some configurations, a GPS receiver 380 may also make use of the antenna 390 to receive GPS signals.

Example Platform Architecture

Figure 4:
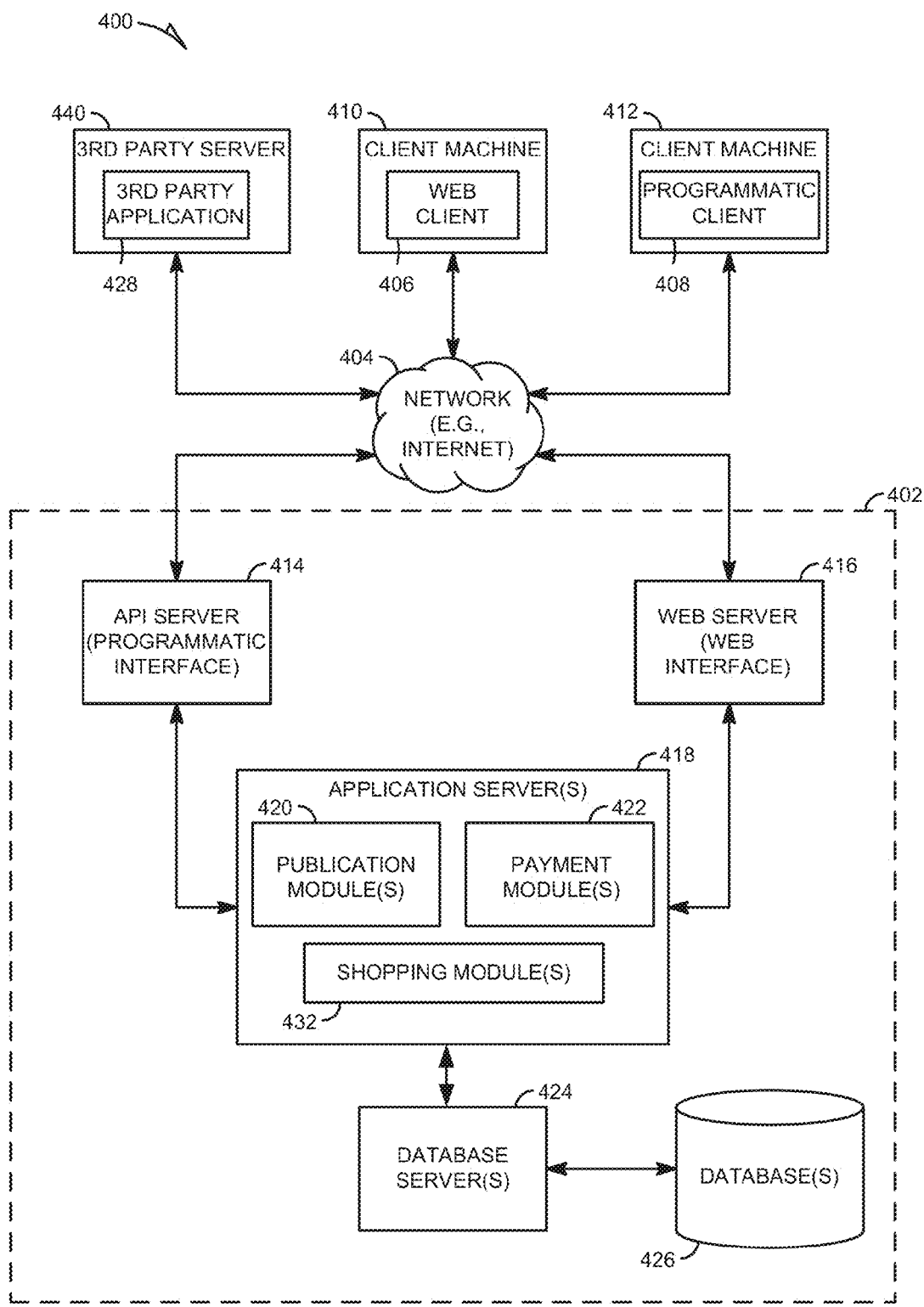
FIG. 4 is a block diagram illustrating a network-based system for delivering prioritized local shopping services, according to an example embodiment.

FIG. 4 is a block diagram illustrating a network-based system 400 for delivering a prioritized local shopping service and optionally payment services, according to an example embodiment. The block diagram depicts a network-based system 400 (in the exemplary form of a client-server system), within which an example embodiment can be deployed is described. A networked system 402, in the example form of a network-based prioritized local shopping service and payment system, that provides server-side functionality, via a network 404 (e.g., the Internet or WAN) to one or more client machines 410, 412. FIG. 4 illustrates, for example, a web client 406 (e.g., a browser, such as the Internet Explorer browser developed by Microsoft Corporation of Redmond, Wash. State) and a programmatic client 408 (e.g., WHERE™ smartphone application from Where, Inc. of Boston, Mass. or prioritized local shopping application specifically designed for implementation on mobile device 115) executing on respective client machines 410 and 412. In an example, the client machines 410 and 412 can be in the form of a mobile device, such as mobile device 115.

An Application Programming Interface (API) server 414 and a web server 416 are coupled to, and provide programmatic and web interfaces respectively to, one or more application servers 418. The application servers 418 host one or more publication modules 420 (in certain examples, these can also include commerce modules, advertising modules, and marketplace modules, to name a few), payment modules 422, and shopping modules 432. The application servers 418 are, in turn, shown to be coupled to one or more database servers 424 that facilitate access to one or more databases 426. In some examples, the application server 418 can access the databases 426 directly without the need for a database server 424.

The publication modules 420 may provide a number of publication functions and services to users that access the networked system 402. The payment modules 422 may likewise provide a number of payment services and functions to users. The payment modules 422 may allow users to accumulate value (e.g., in a commercial currency, such as the U.S. dollar, or a proprietary currency, such as "points") in accounts, and then later to redeem the accumulated value for products (e.g., goods or services) that are advertised or made available via the various publication modules 420, within retail locations, or within external online retail venues. The payment modules 422 may also be configured to present or facilitate a redemption of offers, generated by the shopping modules 432, to a user during checkout (or prior to checkout, while the user is still actively shopping). The payment modules 422 can also be configured to enable payment processing within the navigated shopping service. The shopping modules 432 may provide real-time prioritized local shopping route updates listing physical retail outlets that have items on a shopping list uploaded by a user of the networked system 402. The shopping modules 432 can be configured to use all of the various communication mechanisms provided by the networked system 402 to transmit information to a client machine, such as client machine 412. The shopping modules 432 can also present special offers available from retail merchants, such as merchant 130, to augment the prioritized shopping plan. The offers can be personalized based on current location, time of day, user profile data, past purchase history, or recent physical or online behaviors recorded by the network-based system 400, among other things. While the publication modules 420, payment modules 422, and shopping modules 432 are shown in FIG. 4 to all form part of the networked system 402, it will be appreciated that, in alternative embodiments, the payment modules 422 may form part of a payment service that is separate and distinct from the networked system 402, such as the network-based payment service 140. Additionally, in some examples, the shopping modules 432 may be part of the payment service or may form an offer generation service separate and distinct from the networked system 402. In certain examples, the network-based shopping system 120 can include some or all of the application severs 418.

Further, while the system 400 shown in FIG. 4 employs a client-server architecture, the present invention is of course not limited to such an architecture, and could equally well find application in a distributed, or peer-to-peer, architecture system, for example. The various publication modules 420, payment modules 422, and shopping modules 432 could also be implemented as standalone systems or software programs, which do not necessarily have networking capabilities.

The web client 406 accesses the various publication modules 420, payment modules 422, and shopping modules 432 via the web interface supported by the web server 416. Similarly, the programmatic client 408 accesses the various services and functions provided by the publication modules 420, payment modules 422, and shopping modules 432 via the programmatic interface provided by the API server 414. The programmatic client 408 may, for example, be a smartphone application (e.g., the PAYPAL™ payment application developed by eBay, Inc., of San Jose, Calif. with integrated navigation capabilities) to enable users to shop for items via a mobile device, such as mobile device 115, and submit payment for purchased items directly from the mobile device.

FIG. 4 also illustrates a third party application 428, executing on a third party server machine 440, as having programmatic access to the networked system 402 via the programmatic interface provided by the API server 414. For example, the third party application 428 may, utilizing information retrieved from the networked system 402, support one or more features or functions on a website hosted by the third party. The third party website may, for example, provide one or more promotional, marketplace or payment functions that are supported by the relevant applications of the networked system 402. Additionally, the third party website may provide merchants with access to the local pricing modules 432 for configuration purposes. In certain examples, merchants can use programmatic interfaces provided by the API server 414 to develop and implement rules-based pricing schemes that can be implemented via the publication modules 420, payment modules 422, and shopping modules 432.

Example Shopping Modules

Figure 5:
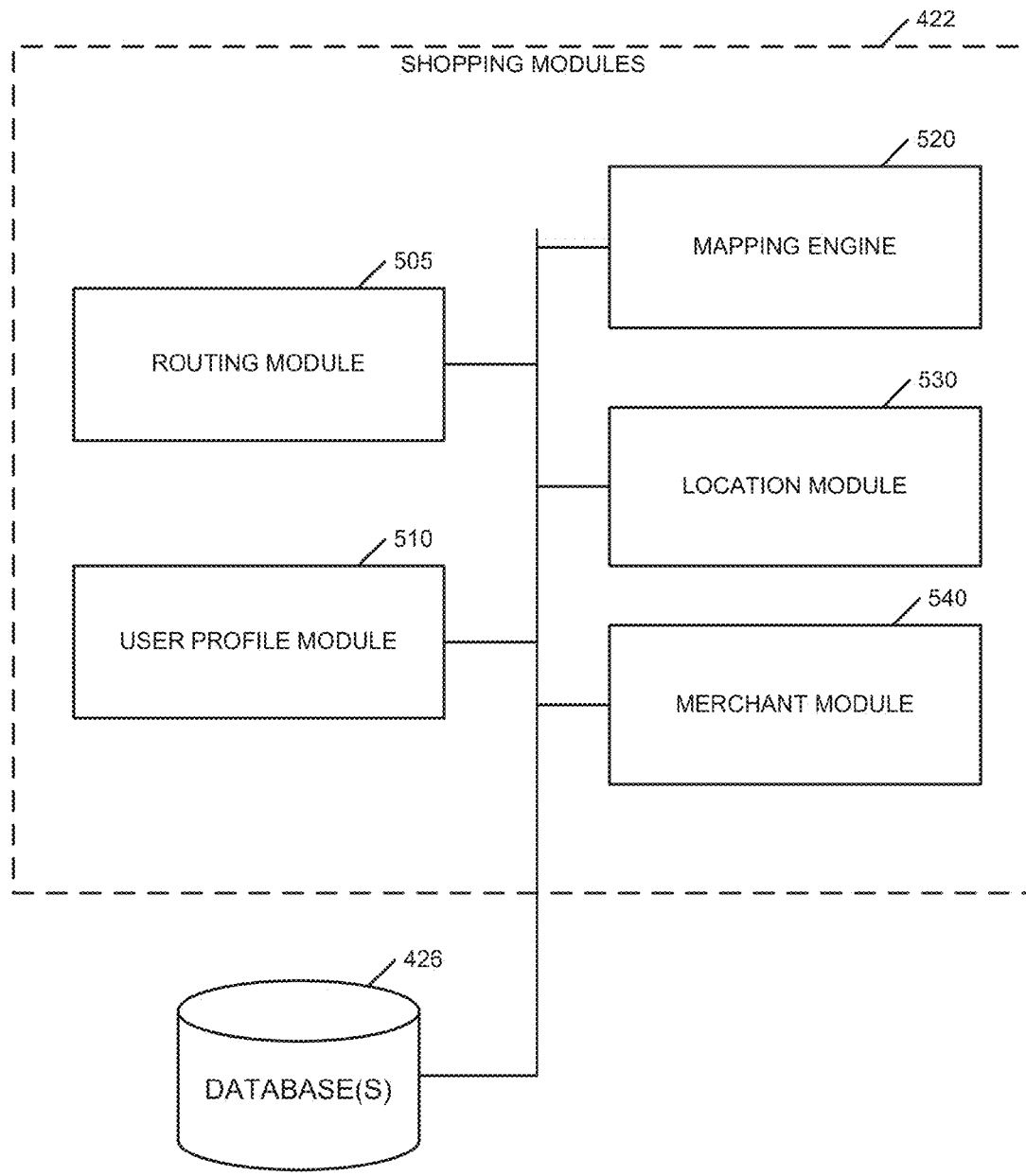
FIG. 5 is a block diagram illustrating shopping modules, according to an example embodiment.

FIG. 5 is a block diagram illustrating shopping modules, according to an example embodiment. In this example, the shopping modules 422 can include a routing module 505, a user profile module 510, a mapping engine 520, a location module 530, and a merchant module 540. In an example, the payment modules 422 can access database 426 to store and/or retrieve payment transaction data, user profile data, and location data, as well as other information to enable prioritized local shopping, such as merchant inventory data, among other things.

The routing module 505 can use information obtained from a user, the location module 530, and the merchant module 540 to create a shopping route that allows a user to optimize efficiency in purchasing items of interest. The routing module 505 can process merchant location information, inventory information, use location information, and busyness (e.g., shopping traffic) information to develop optimized shopping routes or plans.

The user-profile module 510 can manage user preferences, shopping lists, and recent destinations, among other things. In an example, the user-profile module 510 can communicate with database 426 and well as directly with a client machine, such as client machine 412.

The merchant module 540 can manage communications with merchants registered to offer goods or services, such as merchant 130, via the networked system 402. The merchant module 540 can maintain location data and real-time inventory for participating merchants. The merchant module 540 can also maintain busyness data for participating merchants, the busyness data can represent the level of traffic within a physical location during a certain time period. The merchant module 540 can also maintain historical trends in traffic (busyness) within a physical location.

The location module 530 can monitor real-time location information on clients, such as by monitoring (or receiving) location information regarding client machines, such as client machine 410. The location module 530 can communicate real-time location information to the routing module 505 and the mapping engine 520 as necessary.

The mapping engine 520 can work with the routing module 505, location module 530, user-profile module 510, and merchant module 540 to map locations associated with the user, desired route, as well as merchant retail locations selling desired items. In certain examples, the mapping engine 520 can access mall layout maps, merchant location maps, and street maps, among others, to optimize shopping Additional details regarding the functionality provided by the shopping modules 422 are detailed below in reference to FIG. 6 and FIG. 7.

Example Shopping Application

Figure 6:
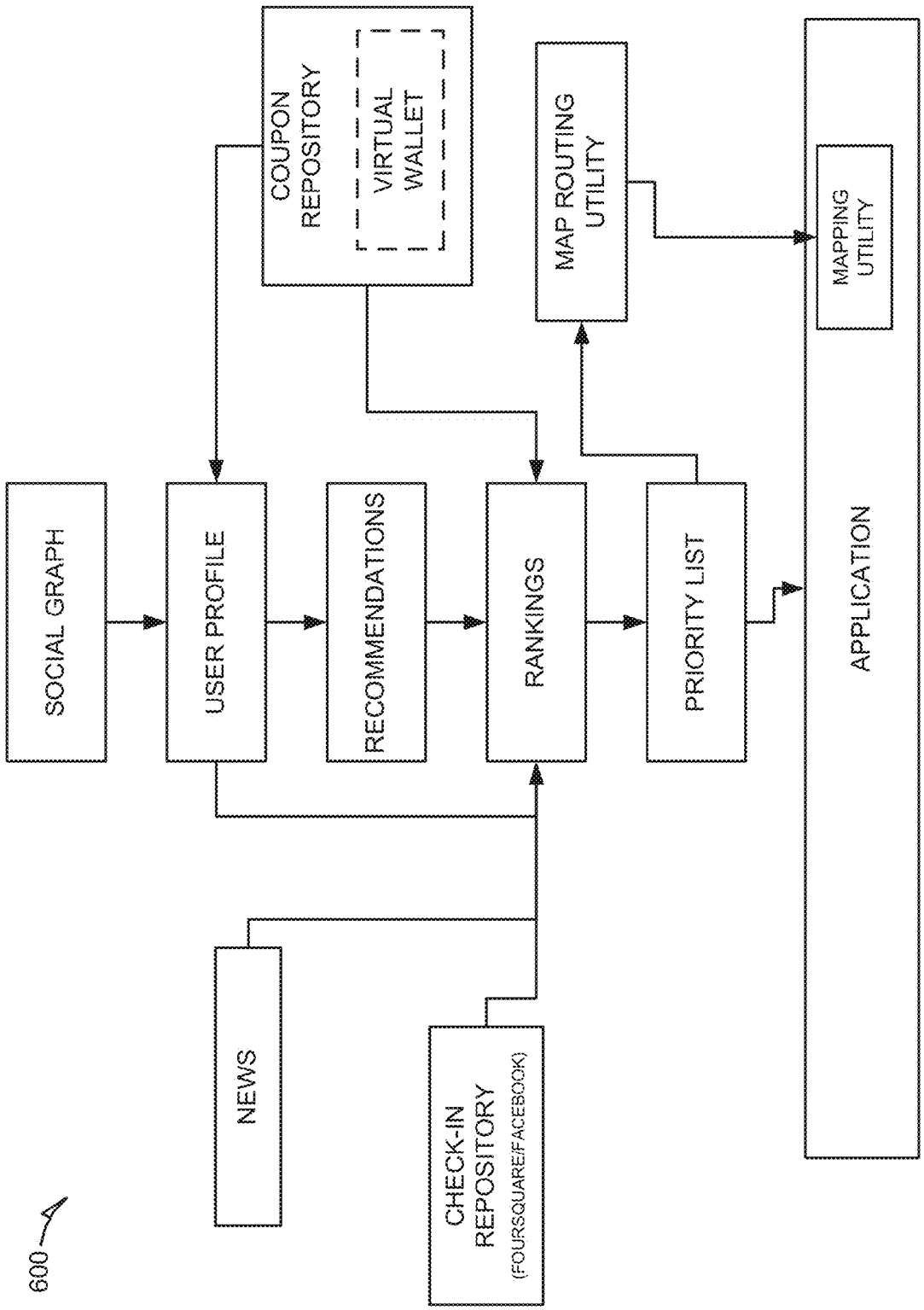
FIG. 6 is a block diagram illustrating a application for prioritized local shopping, according to an example embodiment.

FIG. 6 is a block diagram illustrating an application for prioritized local shopping, according to an example embodiment. In an example, the illustration in FIG. 6 depicts the various inputs that can be used by a prioritized shopping application (or similarly by the network-base shopping system 120).

Example Method

Figure 7:
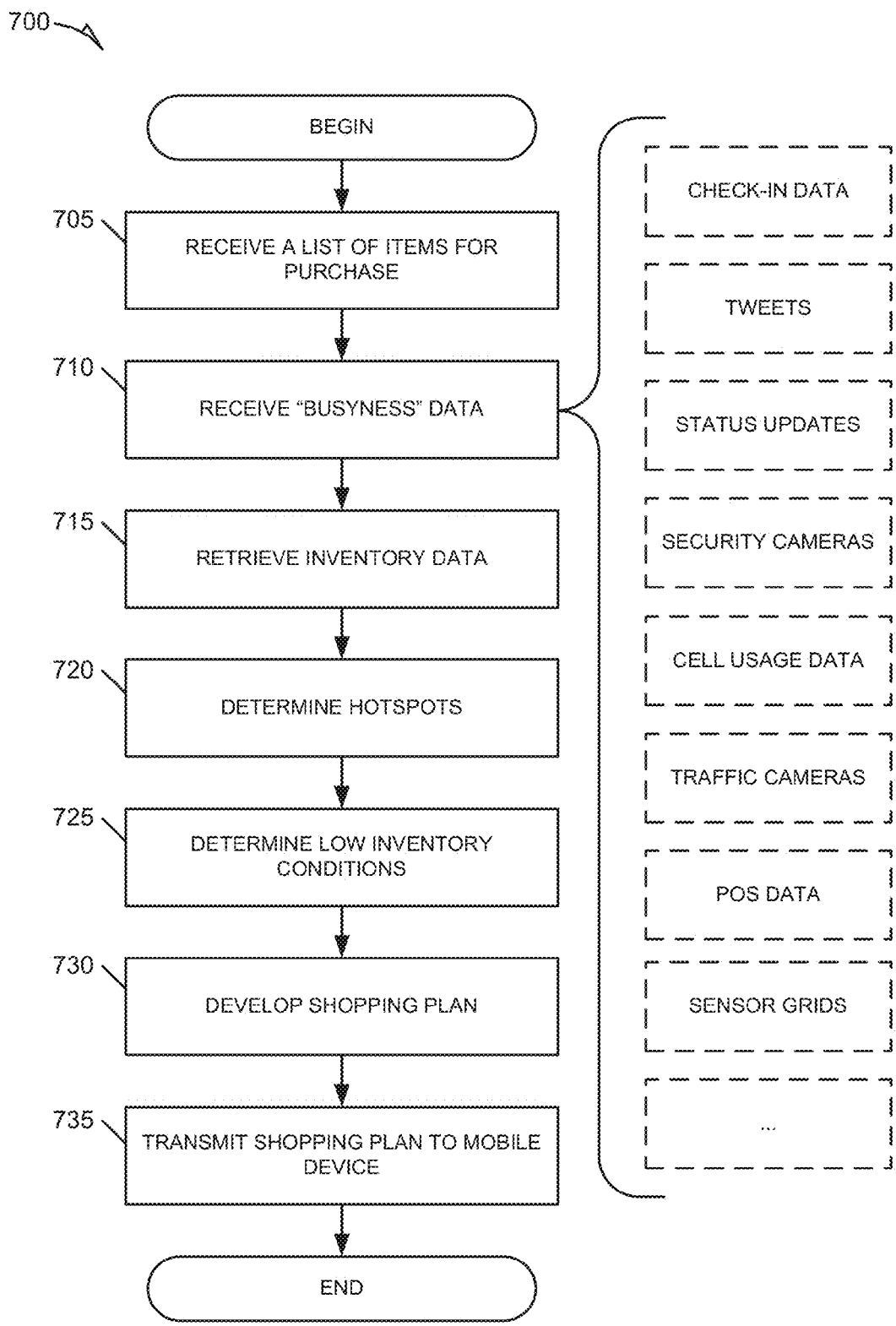
FIG. 7 is a flowchart illustrating a method for providing prioritized local shopping services, according to an example embodiment.

FIG. 7 is a flowchart illustrating a method 700 for providing prioritized local shopping services, according to an example embodiment. In an example, the method 700 can include operations such as, receiving a list of items for purchase at 705, receiving "busyness" data at 710, retrieving inventory data at 715, determining hotspots (e.g., busy merchant locations) at 720, determining low inventory conditions at 725, developing a shopping plan at 730, and transmitting the shopping plan to a mobile device at 735. In this example, the busyness data can include check-in data, tweets, status updates, security cameras, cell usage data, traffic cameras, point of sale (POS) data, and sensor grid data, among other things. Other examples can include more or fewer operations and operations illustrated in FIG. 7 can be performed in different orders.

At 705, the method 700 can begin with the user profile module 510 receiving a list of items for purchase (e.g., a wish list). In an example, the user profile module 510 can access online wish lists maintained by a user within various shopping sites. The user profile module 510 can also interact with a mobile application to obtain a list of shopping items a user desires to purchase. In some examples, a user can maintain shopping lists within a mobile or desktop application that can be accessed upon request or activation of the prioritized shopping service.

At 710, the method 700 can continue with the merchant module 540 receiving or accessing "busyness" data. The busyness data can be associated with merchants included in the shopping list or busyness data can be obtained for all merchants within a certain distance of the user (or along a planned route of travel). As illustrated in FIG. 7, busyness data can include check-in data (e.g., FOURSQUARE), tweets, status updates (e.g., FACEBOOK), security camera feeds, cell usage data from cellular phone providers, traffic camera feeds, point of sale (POS) data from local merchants, and sensor grids, among other things. Busyness data can include any information that provides some direct or indirect indication of how busy a certain location is at a particular time. In an example, the prioritized shopping service can enable crowd-sourcing of busyness data to receive updates directly from users of the service. In this example, a mobile application can be provided to users that allows for streamlined reporting of traffic levels at merchants. The mobile application or the prioritized shopping service can use location information obtained from the mobile device to correlate the traffic reports (busyness reports) to specific merchant locations. In a certain example, the mobile application can provide the user with a simple interface to rank busyness on a scale from 1 to 10.

At 715, the method 700 can continue with the merchant module 540 retrieving inventory data from local merchants. The inventory can be obtained directly from participating merchant or from third party aggregators of real-time inventory data, such as Milo (from eBay, Inc. of San Jose, Calif.). At 720, the method 700 can continue with the mapping engine 520 determining hotspots from from the busyness data received in operation 710. At 725, the method 700 can continue with the merchant module 540 determining low inventor conditions regarding items on the list of target purchase items. At 730, the method 700 can continue with the routing module 505 developing a shopping plan. In an example, the routing module 505 can use inventory data and hotspot information to develop an efficient shopping plan. The prioritized shopping system can be configured to more heavily weight speed or efficiency versus likelihood of obtaining all items on the list of items for purchase. For example, if the routing module 505 is prioritizing obtaining all items, then low inventory conditions may dictate the shopping plan developed. Alternatively, if efficiency is prioritized, then the routing module 505 may attempt to avoid hotspots (e.g., busy merchant locations) to minimize shopping time. At 735, the method 700 can conclude with the networked system 402 transmitting the shopping plan to a mobile device. Once on the mobile device, such as mobile device 115, a prioritized shopping application can use the mobile device's location tracking capabilities to provide prompts to follow the shopping route.

Interface Examples

Figure 8:
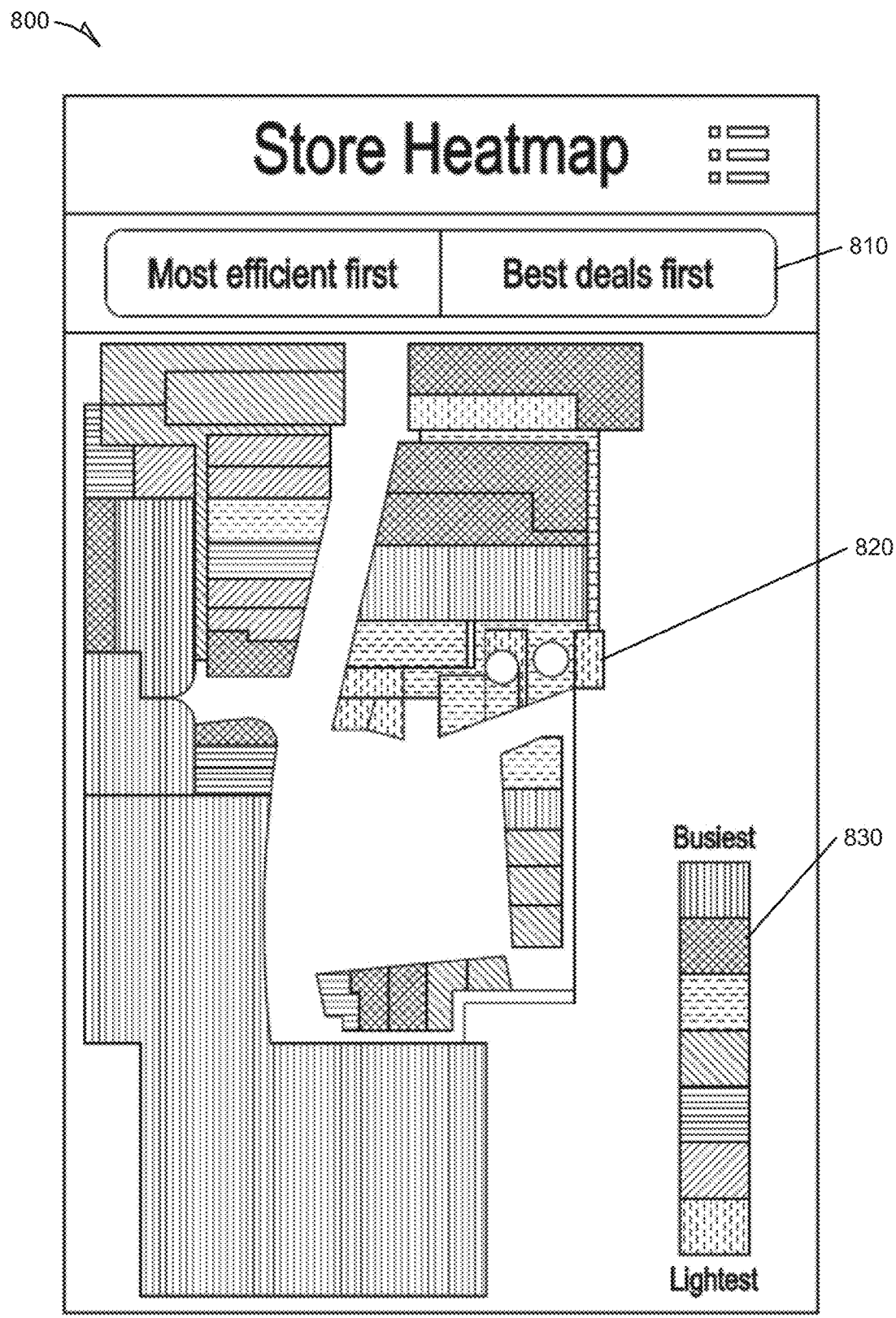
FIG. 8 is an illustration of a mobile device display depicting a heat map, according to an example embodiment.

FIG. 8 is an illustration of a mobile device display depicting a heat map, according to an example embodiment. Interface 800 can include a selection bar 810, a heat map 820, and a legend 830. In an example, the selection bar 810 can allow a user to toggle between different map views. In this example, the selection bar 810 can toggle between a most efficient first view and a best deals first view. In the most efficient first view, the heat map is displaying stores in a busiest to least busy color-code view (color-coding illustrated by different cross hatching patterns). The most efficient first view illustrates which stores it would be most time efficient to visit first (e.g., the currently least busy stores). In a best deals first view, the map can display a color-coded map illustrating the stores with the best offers (e.g., discounts) to the stores with the least favorable discounts. The selection bar 810 controls what is displayed in the heat map 820 portion of the interface.

Another aspect of an example mobile application display can include a prioritized shopping plan view. The prioritized shopping plan can also be displayed in a most efficient first versus best deals first view, prioritizing in a manner similar to described above. The prioritized shopping plan view can include a list of items and associated merchant locations as well as directions for getting from one merchant location to the next.

Another aspect of an example mobile application display can include a prioritized shopping plan view. The prioritized shopping plan can also be displayed in a most efficient first versus best deals first view, prioritizing in a manner similar to described above. The prioritized shopping plan view can include a list of items and associated merchant locations as well as directions for getting from one merchant location to the next.

State Logic Example

Figure 9:
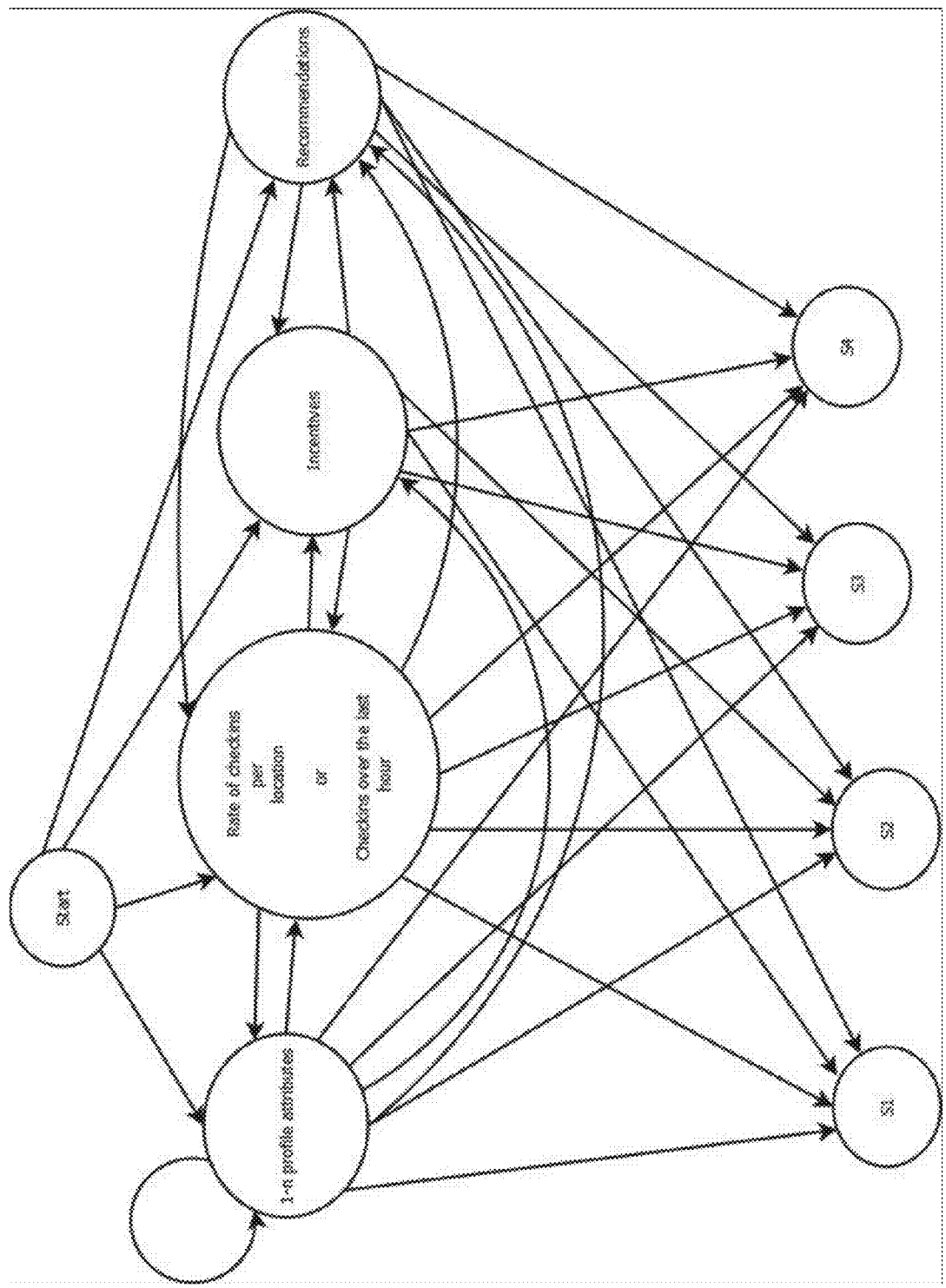
FIG. 9 is a block diagram illustrating inputs and states for a prioritized shopping system, according to an example embodiment.

FIG. 9 is a block diagram illustrating inputs and states for a prioritized shopping system, according to an example embodiment.

In an example, probabilities can be arbitrary and each event (circle in FIG. 9) is independent, accordingly the probability of either leaving an event or repeating an event will sum to 1. However, probabilities of leaving an event or repeating an event are not static. For example, in one iteration a probability of leaving an event, P(A), can be 0.6, which would result in the probability of repeating the event, P(B), as 0.4. In this example, the event repeats and then P(A)=0.8 and P(B)=0.2, resulting in a much lower probability of repeating a second time.

The following outlines an example scenario involving the states (S1, S2, S3, and S4) depicted in FIG. 9. This example scenario assumes that the user has no attributes. Further it is assumed that the probability of a user visiting a popular location to be 0.6, then the probability of ending at S2 is less than 0.4. If it is assumed that the probability of a user using a coupon is 0.8, then the probability of ending at S3 is less than 0.2. Finally, if it is assumed that the probability of a user using recommendations to visit a store is 0.7, then the user will likely end at S4.

In the example depicted by FIG. 9, each representation of S (e.g., S1, S2, S3, and S4) can be an order state used to direct users to a list of stores. For example, S4 can represent a store that is busy, the user has a coupon for, and the store is highly ranked in recommendations received by the user. In an example, all stores in this category would be recommended. In this example, S3 can represent a popular store that the user has a coupon for, but the user has received no recommendations for the store. In this example, S2 can represent a popular store that the user has no coupons for and has received no recommendations. Finally, in this example, S1 can represent a store that the user has no relevant data on.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 10:
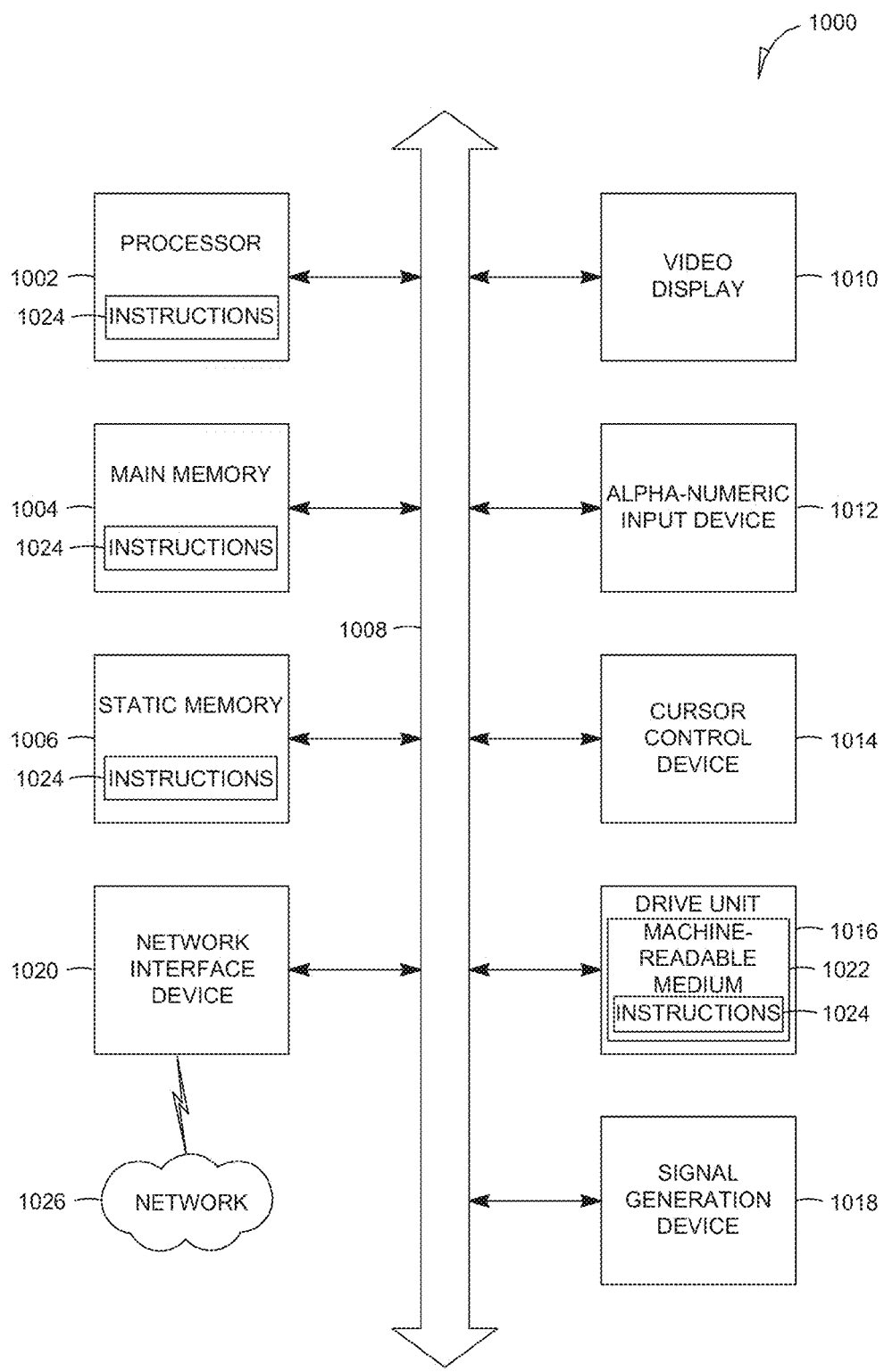
FIG. 10 is a diagrammatic representation of a machine in the example form of a computer system within which a set of instructions for causing the machine to perform any one or more of the methodologies discussed herein may be executed.

FIG. 10 is a block diagram of machine in the example form of a computer system 1000 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a PDA, a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU) or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a user interface (UI) navigation device 1014 (e.g., a mouse), a disk drive unit 1016, a signal generation device 1018 (e.g., a speaker) and a network interface device 1020.

Machine-Readable Medium

The disk drive unit 1016 includes a machine-readable medium 1022 on which is stored one or more sets of instructions and data structures (e.g., software) 1024 embodying or used by any one or more of the methodologies or functions described herein. The instructions 1024 may also reside, completely or at least partially, within the main memory 1004, static memory 1006, and/or within the processor 1002 during execution thereof by the computer system 1000, the main memory 1004 and the processor 1002 also constituting machine-readable media.

While the machine-readable medium 1022 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of example, semiconductor memory devices (e.g., Erasable Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks. A "machine-readable storage medium" shall also include devices that may be interpreted as transitory, such as register memory, processor cache, and RAM, among others. The definitions provided herein of machine-readable medium and machine-readable storage medium are application even if the machine-readable medium is further characterized as being "non-transitory." For example, any addition of "non-transitory, such as non-transitory machine-readable storage medium, is intended to continue to encompass register memory, processor cache and RAM, among other memory devices.

Transmission Medium

The instructions 1024 may further be transmitted or received over a communications network 1026 using a transmission medium. The instructions 1024 may be transmitted using the network interface device 1020 and any one of a number of well-known transfer protocols (e.g., HTTP). Examples of communication networks include a LAN, a WAN, the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Thus, a method and system for prioritized local shopping have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," and "third," and so forth are used merely as labels, and are not intended to impose numerical requirements on their objects.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The invention claimed is:

1. A method of generating a mobile interface comprising:
   receiving, on a shopping service computing device, a list of target items, the list of target items including products or services from one or more previously established shopping lists maintained by a user within a plurality of shopping sites;
   obtaining, by the shopping service computing device, a plurality of inputs from external data sources, the external data sources comprising at least one of a security camera, a traffic camera, or sensor grid data, the plurality of inputs representing busyness data for a plurality of local merchants;
   aggregating, on the shopping service computing device, the busyness data for the plurality of local merchants, at least a portion of the plurality of local merchants selling at least one target item from the list of target items;
   obtaining, by the shopping service computing device, location information of a mobile device of the user, the mobile device employing a location determination application;
   correlating, by the shopping service computing device, the busyness data for the plurality of local merchants to the location of the mobile device of the user;
   generating, by the shopping service computing device, a mobile interface including:
      a color coded graphical map including color coding corresponding to the busyness data for at least a portion of the local merchants; and
      a prioritized shopping plan based at least in part on the busyness data, the correlated location of the mobile device, and the list of target items; and
   communicating, over a network connection from the shopping service computing device, the mobile interface to the mobile device.

2. The method of claim 1, further comprising:
   receiving inventor data associated with at least a merchant of the plurality of local merchants; and
   wherein the generating the prioritized shopping plan includes determining an inventory level of at least a portion of the target items in the list of target items.

3. The method of claim 2, further comprising:
   determining, based on the inventory level of one of the target items, a low inventory level condition of the one of the target items at the merchant; and
   wherein the developing the prioritized shopping plan includes prioritizing the one of the target items with the low inventory level condition.

4. The method of claim 1, further comprising:
   determining, based at least in part on the traffic level, a hotspot within the plurality of local merchants, the hotspot indicates a location with a high traffic level; and
   wherein the developing the prioritized shopping plan includes avoiding the hotspot.

5. The method of claim 4, wherein the determining the hotspot includes determining a time period during which the hotspot occurs at a merchant of the plurality of merchants.

6. The method of claim 1, wherein the generating the prioritized shopping plan includes prioritizing shopping efficiency in purchasing at least a portion of the target items in the list of target items.

7. The method of claim 1, wherein the generating the prioritized shopping plan includes prioritizing obtaining at least one item in the list of target items.

8. The method of claim 1, wherein the generating the prioritized shopping plan includes prioritizing obtaining all of the target items in the list of target items.

9. The method of claim 1, wherein the obtaining of the plurality of inputs includes aggregating crowd-sourced data representative of traffic levels within at least a portion of the plurality of local merchants.

10. The method of claim 1, wherein the obtaining the plurality of inputs from external sources includes additional data sources from at least one of the data types in the following group of data types:
    point of sale data collected through crowd sourcing;
    check-in data;
    tweets;
    status updates;
    security camera feeds;
    cell phone usage data;
    and
    traffic camera feeds.

11. A system configured to generate a mobile interface comprising:
    a server coupled to a network and including one or more processors to execute a plurality of modules, the plurality of modules including:
       a user profile module to manage a list of target items, the list of target items including products or services from one or more previously established shopping lists maintained by a user within a plurality of shopping sites;
       a merchant module to:
       obtain, over the network, a plurality of inputs from external data sources, the external data sources comprising at least one of a security camera, a traffic camera, or sensor grid data, the plurality of inputs indicating a traffic level for a plurality of local merchants;
       aggregate the traffic level for the plurality of local merchants, at least a portion of the plurality of local merchants selling at least one target item from the list of target items;
       a location module configured to obtain, by the shopping service computing device, location information of a mobile device of the user, the mobile device employing a location determination application;
       a mapping engine configured to correlate, by the shopping service computing device, the traffic level of the plurality of local merchants to the location of the mobile device of the user;
       a graphics processing unit of the mobile device configured to generate the mobile interface;
       a routing module configured to generate a prioritized shopping plan based at least in part on the aggregated traffic level, the correlated location of the mobile device, and the list of target items; and
    the server configured to communicate over the network to cause a mobile device to display the mobile interface, the mobile interface including a graphical map display with color coding corresponding to the traffic level of at least a portion of the plurality of local merchants.

12. The system of claim 11, wherein the merchant module manages inventory data associated with at least a merchant of the plurality of local merchants;
    wherein the merchant module maintains inventory levels of at least a portion of the target items in the list of target items; and
    wherein the routing module generates the prioritized shopping plan based at least in part on the inventory levels.

13. The system of claim 12, wherein the merchant module determines, based on the inventory levels, a low inventory level condition of at least one target item in the list of target items; and wherein the routing module generates the prioritized shopping plan based at least in part on prioritizing the one of the target items with the low inventory level condition.

14. The system of claim 11, wherein the merchant module maintains, based at least in part on the traffic level, a hotspot within the plurality of local merchants, the hotspot indicates a location with a high traffic level; and wherein the routing module avoids the hotspot in generating the prioritized shopping plan.

15. The system of claim 14, wherein the merchant module maintains a time period during which the hotspot occurs at a merchant of the plurality of merchants.

16. The system of claim 11, wherein the routing module prioritizes shopping efficiency in purchasing at least a portion of the target items in the list of target items when generating the prioritized shopping plan.

17. The system of claim 11, wherein the routing module prioritizes obtaining at least one item with the list of target items when generating the prioritized shopping plan.

18. A machine-readable storage medium including instructions that, when executed by one or more processors of a machine, cause the machine to perform operations to generate a mobile interface comprising:

receiving a list of target items, the list of target items including products or services from one or more previously established shopping lists maintained by a user within a plurality of shopping sites;

obtaining a plurality of inputs from external data sources, the external data sources comprising at least one of a security camera, a traffic camera, or sensor grid data, the plurality of inputs indicating a traffic level for a plurality of local merchants;

aggregating the traffic level for the plurality of local merchants, at least a portion of the plurality of local merchants selling at least one target item from the list of target items;

obtaining location information of a mobile device of the user, the mobile device employing a location determination application;

correlating the aggregated traffic level for the plurality of local merchants to the location of the mobile device of the user;

generating the mobile interface to include a color coded graphical map including color coding corresponding to the traffic level for at least a portion of the local merchants; and a prioritized shopping plan based at least in part on the aggregated traffic level and the list of target items; and causing the mobile device to display the prioritized shopping plan within the mobile interface.

19. The machine-readable medium of claim 18, further comprising instructions that cause the machine to receive inventory data associated with at least a merchant of the plurality of local merchants; and wherein the instructions that cause the machine to develop the prioritized shopping plan further include instructions to determine an inventory level of at least a portion of the target items in the list of target items.

20. The machine-readable medium of claim 19, further including instructions that cause the machine to determine, based on the inventory level associated with one of the target items, a low inventory level condition of at least one of the target items in the list of target items; and wherein the instructions that cause the machine to develop the prioritized shopping plan further include instructions to prioritize the at least one of the target items with the low inventory level condition.

* * * * *